(12) United States Patent
Ozaki et al.

(10) Patent No.: US 7,863,439 B2
(45) Date of Patent: Jan. 4, 2011

(54) CELLULOSE ESTER HAVING IMPROVED STABILITY TO WET HEAT

(75) Inventors: Toru Ozaki, Tatsuno (JP); Toru Shibata, Himeji (JP); Shu Shimamoto, Himeji (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 822 days.

(21) Appl. No.: 10/546,838

(22) PCT Filed: Feb. 25, 2004

(86) PCT No.: PCT/JP2004/002230

§ 371 (c)(1),
(2), (4) Date: Aug. 24, 2005

(87) PCT Pub. No.: WO2004/076490

PCT Pub. Date: Sep. 10, 2004

(65) Prior Publication Data

US 2006/0142559 A1    Jun. 29, 2006

(30) Foreign Application Priority Data

Feb. 25, 2003    (JP) ............................. 2003-048116

(51) Int. Cl.
| | |
|---|---|
| *C08B 3/00* | (2006.01) |
| *C08B 5/00* | (2006.01) |
| *C08B 7/00* | (2006.01) |
| *C08B 13/00* | (2006.01) |
| *C08B 3/06* | (2006.01) |
| *C08L 1/00* | (2006.01) |
| *C08L 3/00* | (2006.01) |
| *C08L 5/00* | (2006.01) |
| *C09D 101/00* | (2006.01) |
| *C09D 103/00* | (2006.01) |
| *C09D 105/00* | (2006.01) |
| *C09J 101/00* | (2006.01) |
| *C09J 103/00* | (2006.01) |
| *C09J 105/00* | (2006.01) |

(52) U.S. Cl. ........................... 536/58; 536/69; 428/532; 106/162.1; 106/168.01

(58) Field of Classification Search .................... 536/58, 536/69; 428/532; 106/162.1, 168.01
See application file for complete search history.

(56) References Cited

U.S. PATENT DOCUMENTS 5,256,006 A * 10/1993 Harding ....................... 405/255
5,609,677 A * 3/1997 Itoh et al. ............... 106/168.01

FOREIGN PATENT DOCUMENTS

| EP | 952160 A1 | * 10/1999 |
|---|---|---|
| JP | 63-105665 A | 5/1988 |
| JP | 1-96231 A | 4/1989 |
| JP | 1-96232 A | 4/1989 |
| JP | 7-213270 A | 8/1995 |
| JP | 10-316701 A | 12/1998 |
| JP | 11-5851 A | 1/1999 |
| JP | 11-310640 A | 11/1999 |
| JP | 2000-313766 A | 11/2000 |
| JP | 2000-314811 A | 11/2000 |
| JP | 2002-40244 A | 2/2002 |
| JP | 2002-62430 A | 2/2002 |
| JP | 2002-131536 A | 5/2002 |
| JP | 2002-212338 A | 7/2002 |
| JP | 2002-317059 A | 10/2002 |
| JP | 2002-348403 A | 12/2002 |

OTHER PUBLICATIONS

Cellulose Commun. vol. 5, No. 2 (1998), pp. 101-104.

* cited by examiner

*Primary Examiner*—Shaojia Anna Jiang
*Assistant Examiner*—Scarlett Goon
(74) *Attorney, Agent, or Firm*—Birch, Stewart, Kolasch & Birch, LLP

(57) ABSTRACT

The present invention provides a cellulose ester in which heat resistance under wet condition is compatible with both releasability and spinnability even when the amount of the residual solvent is small in a casting process. The cellulose ester fulfills the following formula:

$$0.5 < (B)/(A) < 1.5$$

wherein (A) and (B) represent the total amount (in terms of molar amount) of residual sulfuric acid in 1 gram of the cellulose ester and the total amount (in terms of molar amount) of calcium contained in 1 gram of the cellulose ester, respectively.

9 Claims, No Drawings

CELLULOSE ESTER HAVING IMPROVED STABILITY TO WET HEAT

TECHNICAL FIELD

The present invention relates to a cellulose ester useful for forming a film (e.g., a polarizer protective film, a color filter, and a film of a photosensitive material) or a fiber, and a film formed from the cellulose ester.

BACKGROUND ART

Films formed from a cellulose ester typified by a cellulose triacetate are tough and excellent in properties such as dimensional stability, heat resistance and optical isotropy. Therefore, these films have been used in various applications such as a support (or a substrate, or a base material) of an optical film (e.g., a base film for a photosensitive material), a polarizer protective film in Liquid crystal displays (LCDs) (a liquid crystal protective film) and a color filter.

Furthermore, recently in order to improve narrow viewing-angle latitudes of LCD, a technique has been proposed to produce a film which causes a moderate retardation in the thickness direction (Rt) due to a refractive index of the thickness direction smaller than that of a right angle direction to the thickness direction, and use the film as a retarder film (and a WV film). Accordingly, the cellulose ester film is required to satisfy optical characteristics such as a small Yellowness Index, a small haze, a small birefringence of a film in the plane, as well as a high transparency. In recent years, these LCDs have been widely used as not only display of a word processor or a personal computer but also display of a television or a Digital Versatile Disc (DVD), and these apparatuses are required to have a wider and thinner screen.

Moreover, in accordance with enlarging a liquid crystal screen, the demand for the wider viewing-angle latitude has been increased. Furthermore, since the portability of the LCD has been required, downsizing, particularly reducing the thickness, has been desired.

Cellulose Commun Vol5, No2 (1998) summarizes suitable physical properties for such a liquid crystal protective film and a WV film. For such applications, it is preferred to use a film which does not have linear drawing in molecules and have an optical isotropy in the film plate. A cellulose ester film, or the above-mentioned liquid crystal protective film or WV film is generally produced by casting a solution (dope). This method comprises casting a dope (solution) containing a cellulose ester and a solvent on a surface-polished stainless belt or metal drum, evaporating the organic solvent or cooling the dope for solidification, and releasing the film before the metal support circulates once, and drying the film.

In the process releasing the film from the metal support, it is effective that the release tension is controlled as low as possible on the release for getting an objective Rt as usage. That is, in the case where the release tension is low, the linear drawing on the release is avoidable. Further, the good releasability from the metal support in the flow-casting enlarges the shrinkage on the metal support, and therefore, the linear drawing in the machine direction or the traverse direction is avoided.

In this way, it is necessary to shrink the film on the metal support when the film is cast from a cellulose ester solution (dope). If the film cannot be shrinked, the orientation occurs due to the internal stress. Since the cellulose ester has a stiff chain and has bulky substituent(s), the once generated orientation is not disturbed easily and exerts great influence dynamically on properties of the film. In the case where the residual solvent is lowered, it is advantageous that the coefficient of shrinkage is decreased. Therefore, it is desired to obtain a cellulose ester being excellent in releasability in the releasing step of the casting in which the residual solvent is low.

In the cellulose ester film, particularly a cellulose triacetate, is preferably used. Moreover, using a mixed fatty acid ester of cellulose that is a cellulose esterified with a mixed fatty acid is sometimes attempted.

On the one hand, a cellulose ester is easy to be hydrolyzed. In the case of using a cellulose ester as a protective film for a polarizer (a liquid crystal protective film), a color filter or a retarder plate in LCD which is often used for a long period, therefore, the cellulose ester is required to have heat resistance under wet condition appropriate to the envisioned long-term use. Also in this point, enlargement of LCD screen in the recent requests that the cellulose ester has further improvement in heat resistance under wet condition. That is, the polarizer is damaged due to insufficient heat resistance under wet condition of the protective film. Further, the possibility of damaging is increased when the area of the cellulose ester film is broadened.

On the other hand, concerning a cellulose diacetate, in the case of producing a fiber by using a dope (solution) containing a cellulose ester (such as a cellulose diacetate) and a solvent, a high spinnability is required. A common method using a cellulose diacetate includes a dry-spinning which comprises discharging a dope from a spinneret (nozzle), in which the dope contains a cellulose diacetate dissolved in an organic solvent (such as acetone), and drying the discharged matter with evaporating the solvent by hot air or other means. In order to inhibit a clog in the spinneret (nozzle), the releasability of the cellulose acetate from a metal (metallic material) is required. Also, a fiber obtained by spinning the cellulose ester is required to be enhanced in hydrolysis resistance to prevent the fiber from adhesion of an odor of a fatty acid derived from the hydrolysis.

Regarding the cellulose diacetate, techniques for inhibiting the hydrolysis by addition of a metal salt or a metal ion have been disclosed. Japanese Patent Application Laid-Open No. 105665/1988 (JP-63-105665A) and Japanese Patent Application Laid-Open No. 96231/1989 (JP-1-96231A) disclose a technique utilizing an action of a buffer solution obtained by addition of an alkali metal salt. Moreover, Japanese Patent Application Laid-Open No. 96232/1989 (JP-1-96232A) discloses a technique for inhibiting a hydrolysis of a cellulose acetate due to the residual free acid by adding a hydroxide, for example, a hydroxide of sodium or calcium, to a dope. Further, the applicant of the present application discloses that in Japanese Patent Application Laid-Open No. 213270/1995 (JP-7-213270A) the hydrolysis reaction can be effectively inhibited by adding a water-soluble metal salt containing an alkaline earth metal ion and/or a trivalent or higher metal ion. These applications show that the more the amount of the metal ion is, the higher the inhibition effect on the hydrolysis is. However, in the case of increasing the amount of the metal ion, the clog or the like in the nozzle part occurs because of the releasability from the metallic material on discharging the fiber. Further, in the case of film-forming from the cellulose ester, the releasability on flow-casting is deteriorated, and as a result, there is a possibility that the surface smoothness of the obtained cellulose ester film is damaged or that some troubles such as break occurs in reducing the thickness of the cellulose ester film.

On the other hand, as a technique for improving releasability from a support and spinnability in a solution casting process, Japanese Patent Application Laid-Open No. 316701/

1998 (JP-10-316701A) discloses a technique that even the small amount of the residual solvent in the above-mentioned casting process makes the releasability from the support more excellent when the total content of an alkali metal and an alkaline earth metal is not more than $5.5 \times 10^{-6}$ equivalent in 1 gram of a cellulose ester. The applicant of the present application discloses in Japanese Patent Application Laid-Open No. 316701/1998 (JP-10-316701A) that a cellulose acetate is capable of releasing from a support by limiting the amount of the alkaline earth metal in the cellulose acetate even when the amount of the residual solvent is small with the use of an excellent casting process. In the cellulose acetate, however, heat resistance under wet condition was insufficient.

Moreover, Japanese Patent Application Laid-Open No. 131536/2002 (JP-2002-131536A) discloses a composition in which the content of an alkaline earth metal is 1 to 50 ppm in a polarizer protective film, which is formed from a mixed fatty acid ester of cellulose (a cellulose acetate propionate). This document mentions that the amount of residual sulfuric acid (as the content of sulfur element) in the mixed fatty acid ester is 1 to 50 ppm. Further, Japanese Patent Application Laid-Open No. 310640/1999 (JP-11-310640A) discloses to use a cellulose acylate containing 10 to 100 ppm of an alkaline earth metal in a preparation method of a cellulose acylate. Furthermore, Japanese Patent Application Laid-Open No. 314811/2000 (JP-2000-314811A) discloses a cellulose ester film having a specific molecular weight distribution, and Japanese Patent Application Laid-Open No. 62430/2000 (JP-2000-62430A) discloses an optical film which comprises a cellulose ester having a specific substitution degree of acyl group. These documents mention that the amount of a calcium component is not more than 60 ppm. Japanese Patent Application Laid-Open No. 40244/2002 (JP-2002-40244A) discloses a composition in which the content of an alkaline earth metal is not more than 30 ppm for a film of a cellulose ester.

Moreover, Japanese Patent Application Laid-Open No. 5851/1999 (JP-11-5851A) discloses that, if a cellulose ester has a specific range in the total substitution degree of acyl groups at 2-, and 3-positions and a specific range in the substitution degree of acyl group at 6-position, a film having an excellent retardation (Rt) in the thickness direction can be obtained even through cooling at a low temperature. However, this document has no disclosure regarding heat resistance under wet condition or releasability. Moreover, Japanese Patent Application Laid-Open No. 212338/2002 (JP-2002-212338A) discloses that a solution of a cellulose ester in which the total substitution degree of acyl groups at 2-, and 3-positions is in a specific range and the substitution degree of acyl group at 6-position is in a specific range has a low viscosity within a practicable dope concentration range. This document mentions an addition of a metal salt, however, a heat resistance under wet condition thereof is unsatisfactory.

As just described, in any techniques mentioned above, heat resistance under wet condition of a cellulose ester cannot be compatible with the both properties of releasability from a support and spinnability even when the amount of the residual solvent is small in the solution casting process.

It is therefore an object of the present invention to provide a cellulose ester which has a high releasability from a support (that is, has a low release strength) through a casting (or a solution casting) process as well as is excellent in heat resistance under wet condition, and a dope containing the cellulose ester. It is another object of the invention to provide a cellulose ester not only which has a high releasability from a support in a casting process and is excellent in heat resistance under wet condition but also which is high in optical characteristics, and to provide a dope containing the cellulose ester. It is still another object of the invention to provide a cellulose ester having a high spinnability on producing a fiber with a dope of the cellulose ester, and a dope containing the cellulose ester. It is a further object of the invention to provide a cellulose ester film having releasability, optical characteristics and spinnability, and further being excellent in heat resistance under wet condition.

DISCLOSURE OF THE INVENTION

The inventors of the present invention made intensive studies to achieve the above objects and finally found that (a) regarding a cellulose ester, the ratio of calcium in alkaline earth metals relative to the residual sulfuric acid group exerts an influence on heat resistance under wet condition or releasability from a metallic material; that (b) among alkaline earth metals, only calcium has a significant effect on heat resistance under wet condition, and other alkaline earth metals affect on hydrolysis but are not very responsible for heat resistance under wet condition; that (c) there is a maximum limited amount for calcium to exert a good releasability from a metallic material; and that (d) there is a minimum limited amount for calcium to exert the preferred heat resistance under wet condition; and further that (e) a cellulose acetate in which the degrees of substitution at 2- and 3-positions are in a specific range and the degree of substitution at 6-position is in a specific range and is used in combination with the above-mentioned (a) contributes to obtain a cellulose ester film having an excellent solution stability, an excellent releasability from a metallic material, or smoothness, and an improved heat resistance under wet condition can be obtained even in the case of using a solvent other than methylene chloride. The present invention was accomplished based on the above findings.

That is, the present invention includes (1) a cellulose ester fulfilling the following formula:

$$0.5 < (B)/(A) < 1.5$$

wherein (A) is the total amount (in terms of molar amount) of residual sulfuric acid in 1 gram of said cellulose ester (hereinafter, sometimes referred to as a total amount of the residual sulfuric acid), and (B) is the total amount (in terms of molar amount) of calcium contained in 1 gram of said cellulose ester;

(2) a cellulose ester fulfilling the following formula:

$$0.5 < (B)/(A) < 1.2$$

wherein (A) is the total amount (in terms of molar amount) of residual sulfuric acid in 1 gram of said cellulose ester, and (B) is the total amount (in terms of molar amount) of calcium contained in 1 gram of said cellulose ester;

(3) a cellulose ester fulfilling the following formula:

$$0.6 < (B)/(A) < 1.0$$

wherein (A) is the total amount (in terms of molar amount) of residual sulfuric acid in 1 gram of said cellulose ester, and (B) is the total amount (in terms of molar amount) of calcium contained in 1 gram of said cellulose ester;

(4) a cellulose ester fulfilling the following formula:

$$0.75 < (B)/(A) < 1.0$$

wherein (A) is the total amount (in terms of molar amount) of residual sulfuric acid in 1 gram of said cellulose ester, and (B) is the total amount (in terms of molar amount) of calcium contained in 1 gram of said cellulose ester;

(5) a cellulose ester according to any one of the above-mentioned esters (1) to (4), wherein the total amount (A) of residual sulfuric acid in 1 gram of said cellulose ester is $1 \times 10^{-7}$ to $500 \times 10^{-7}$ mol;

(6) a cellulose ester according to any one of the above-mentioned esters (1) to (5), wherein the total amount (B) (in terms of molar amount) of calcium contained in 1 gram of said cellulose ester fulfills the following formula:

$$5 \times 10^{-7} < (B) < 20 \times 10^{-7};$$

(7) a cellulose ester according to any one of the above-mentioned esters (1) to (5), wherein the total amount (B) (in terms of molar amount) of calcium contained in 1 gram of said cellulose ester fulfills the following formula:

$$8 \times 10^{-7} < (B) < 15 \times 10^{-7};$$

(8) a cellulose ester according to any one of the above-mentioned esters (1) to (7), which is a cellulose acetate and has an average degree of acetylation from 43.7 to 62.5%;

(9) a cellulose ester according to any one of the above-mentioned esters (1) to (8), which is a mixed fatty acid ester of cellulose;

(10) a cellulose ester according to any one of the above-mentioned esters (1) to (8), which is a cellulose acetate (a cellulose triacetate), in which the degrees of substitution at 2- and 3-positions are not less than 1.70 and not more than 1.95, and the degree of substitution at 6-position is not less than 0.88;

(11) a cellulose ester according to any one of the above-mentioned esters (1) to (8), which is a cellulose acetate (a cellulose triacetate) in which the degrees of substitution at 2- and 3-positions are not less than 1.80 and not more than 1.95, and the degree of substitution at 6-position is not less than 0.88 and not more than 0.95;

(12) a cellulose ester according to any one of the above-mentioned esters (1) to (8), which is a cellulose acetate (a cellulose triacetate), wherein the degrees of substitution at 2- and 3-positions are not less than 1.84 and not more than 1.92, and the degree of substitution at 6-position is not less than 0.89 and not more than 0.92;

(13) a cellulose ester according to any one of the above-mentioned esters (1) to (12), which is produced by using a sulfuric acid catalyst;

(14) a cellulose ester according to any one of the above-mentioned esters (1) to (13), which comprises adding water and/or magnesium acetate and/or magnesium hydroxide at the time when esterification is completed, and adding calcium hydroxide on and after a ripening step for stabilizing the cellulose ester;

(15) an optical film comprising a cellulose acetate recited in any one of the above-mentioned (1) to (14);

(16) an optical film according to the above-mentioned (15), which is any one of films selected from the group consisting of a protective film for a polarizer, a retarder film, a scattering film, and a widen viewing angles (or viewing angle compensator) film (a WV film);

(17) a process for producing a cellulose ester recited in any one of cellulose esters of the above-mentioned (1) to (14), which comprises acylating a cellulose in the presence of sulfuric acid catalyst, and hydrolyzing (or deacylating) the acylated cellulose to obtain the cellulose ester; and further includes a step for neutralizing said sulfuric acid at least in part with a neutralizing agent, and a step for adding a calcium component thereto;

(18) a process according to the above-mentioned (17), which comprises acylating (particularly, acetylating) the cellulose with an acylating agent (particularly, an acetylating agent) in the presence of sulfuric acid catalyst, hydrolyzing (or ripening) the acetylated cellulose, and adding the calcium component thereto to obtain the cellulose ester, wherein the molar ratio (B)/(A) determined from (A) the total amount (in terms of molar amount) of residual sulfuric acid in 1 gram of the cellulose ester and (B) the total amount (in terms of molar amount) of calcium contained in 1 gram of said cellulose ester is adjusted into the range of the following formula:

$$0.5 < (B)/(A) < 1.5$$

by addition of the calcium component, and the addition of the calcium component (particularly, calcium hydroxide) is carried out after said sulfuric acid is neutralized at least in part with a neutralizing agent (particularly, a neutralizing agent containing a magnesium component) at (i) the time when the acylating (particularly, acetylating) step is finished and before the ripening step is not started yet, or (ii) the time when the hydrolyzing step is finished and the adding step of the calcium component is not started yet.

(19) a method for improving heat resistance under wet condition of a cellulose ester, which comprises adjusting the molar ratio (B)/(A) determined from (A) the total amount (in terms of molar amount) of residual sulfuric acid in 1 gram of said cellulose ester and (B) the total amount (in terms of molar amount) of calcium contained in 1 gram of said cellulose ester into the range of the following formula.

$$0.5 < (B)/(A) < 1.5$$

Throughout this specification, the term "a cellulose acetate" means a cellulose ester in which an acyl group as a substituent fundamentally comprises only acetyl group, not comprises other acyl groups (e.g., an acyl group having three or more carbon atoms, such as propionyl group).

Moreover, throughout this specification, the phrase "the total amount of residual sulfuric acid in a cellulose ester" means not only residual free sulfuric acid ($H_2SO_4$) in a cellulose ester, but also sulfuric acid group (sulfo group) bonded to a cellulose.

DETAILED DESCRIPTION OF THE INVENTION

The cellulose ester of the present invention can be produced by esterifying a pulp. The species of the pulp is not particularly limited to a specific one, and may be used various pulps. Typically, at least one pulp selected from a wood pulp (e.g., a hardwood pulp and a softwood pulp) and a linter pulp may be used, and the wood pulp and the linter pulp may be used in combination. The content of α-cellulose, which is an indicator of purity of a pulp, may be selected within the range of, for example, about 90 to 100% by weight, and practically about 92 to 99% by weight in a wood pulp. According to the present invention, a low-purity pulp such as a pulp having an α-cellulose content of about 90 to 97% by weight (in particular about 92 to 96% by weight) may be used. Among these pulps, the wood pulp (e.g., the hardwood pulp) is practically used. In the present invention, a low-quality cellulose material (e.g., a wood pulp having a hemicellulose content of about 3 to 20% by weight (particularly preferably about 4 to 8% by weight)) may be also used.

As described above, a cellulose ester produced by using a hardwood pulp as a raw material is generally inferior in releasability of a film in the casting process, and a cellulose ester produced by using a softwood pulp as a raw material is usually inferior in optical characteristics (e.g., transparency) or spinnability. The present invention can improve releasability of a cellulose ester film and optical characteristics (such as transparency) or spinnability of a cellulose ester in spite of using such a wood pulp (e.g., a hardwood pulp) as a raw material.

The cellulose ester may be obtained by a conventional production technology, for example, a process using sulfuric acid as a catalyst, a acetic acid process, a methylene chloride process, and others.

The cellulose ester preferably used in the present invention may be mainly classified into the following three categories:

(1) a cellulose acetate obtained by using acetic acid on esterification, (2) a mixed fatty acid ester of cellulose, in which particularly preferable one is obtained by esterifying a cellulose with a mixed fatty acid containing acetic acid, and (3) a cellulose acetate (a cellulose triacetate) in which the degrees of substitution at 2- and 3-positions are in a specific range and the degree of substitution at 6-position is in a specific range.

Firstly, the embodiment (1) of the cellulose ester is described.

The cellulose ester (the cellulose acetate) may be produced by, if necessary, activation of a cellulose with an organic acid (e.g., acetic acid); acylation (or esterification, particularly acetylation) of the cellulose in the presence of an acid catalyst (particularly sulfuric acid); addition of water or a diluted acetic acid as a stopping step for the esterification; if necessary, partially neutralization of the acid catalyst; and hydrolysis of the resulting matter [that is, ripening]. More specifically, the cellulose acetate may be usually produced by activation of a pulp (cellulose) with acetic acid or the like (activating step), preparation of triacetate with acetic anhydride in the presence of a sulfuric acid as a catalyst (acetylation step), and adjustment of the degree of acetylation by saponification (hydrolysis) (saponification or ripening step). In this method, the activating step may be conducted, for example, by spraying acetic acid or hydrated acetic acid to the pulp (cellulose) or dipping the pulp (cellulose) in acetic acid or hydrated acetic acid, or others. The amount of acetic acid is about 10 to 100 parts by weight, preferably about 20 to 80 parts by weight, and more preferably about 30 to 60 parts by weight, relative to 100 parts by weight of the pulp (cellulose). The amount of acetic anhydride in the acetylation step (acetylating step, esterifying step) may be selected from a certain range so that the degree of acetylation is in the above-mentioned range. For example, the amount of acetic anhydride is about 230 to 300 parts by weight, preferably about 240 to 290 parts by weight, and more preferably about 250 to 280 parts by weight, relative to 100 parts by weight of the pulp (cellulose).

In the acetylation step, as a solvent, acetic acid is usually employed. The amount of acetic acid relative to 100 parts by weight of the pulp (cellulose) is, for example, about 200 to 700 parts by weight, preferably about 300 to 600 parts by weight, and more preferably about 350 to 500 parts by weight. As a catalyst for esterification step or ripening step, usually sulfuric acid is employed. The amount of sulfuric acid relative to 100 parts by weight of the cellulose is usually about 1 to 15 parts by weight, preferably about 5 to 15 parts by weight, and particularly about 5 to 10 parts by weight. Moreover, the saponification or ripening may for example be conducted at a temperature of about 50 to 70° C. Incidentally, the acid catalyst (sulfuric acid) may be neutralized in part with a neutralizing agent and the partly neutralized catalyst is sometimes utilized as a catalyst for hydrolysis or ripening.

Incidentally, the acid catalyst (particularly sulfuric acid) is often neutralized by adding a neutralizing agent (or stabilizer) such as an alkali or alkaline earth metal compound (e.g., a metal oxide, a metal hydroxide, and a metal salt) at a suitable step after acylation (acetylation) [for example, in a course after acetizing step before hydrolysis; after hydrolysis or ripening; or others)] in the production process of the cellulose ester (cellulose acetate). The neutralizing agent may be divisionally added in a plurality of steps. For example, after acetylation (step), the acid catalyst (sulfuric acid) may be partially neutralized (neutralized in part) by adding the neutralizing agent, and after hydrolysis step, the acid catalyst may be further neutralized (completely neutralized).

In order to improve optical characteristics of a cellulose acetate, treatment of a cellulose acetate with an oxidizing agent (or an oxidant) may be conducted in a suitable stage of production, for example, after the acetylation, or after the saponification or ripening. Examples of the oxidant include hydrogen peroxide; a peracid such as performic acid, peracetic acid and perbenzoic acid; and an organic peroxide such as diacetyl peroxide. The oxidant may be used singly or in combination. The preferred oxidant is one which can be easily removed from the cellulose acetate without leaving any appreciable residues, thus including, for example, hydrogen peroxide, performic acid, and peracetic acid. The particularly preferred oxidant includes hydrogen peroxide or peracetic acid. The amount of the oxidant may be selected depending on the level of the desired optical characteristics. The amount of the oxidant is, for example, about 0.01 to 5 parts by weight, preferably about 0.1 to 2.5 parts by weight, and particularly about 0.1 to 1 parts by weight, relative to 100 parts by weight of the cellulose acetate. The treatment with the oxidant may be conducted depending on the kind of the oxidant, for example, at about 20 to 100° C. and preferably about 30 to 70° C.

The average degree of acetylation of the cellulose acetate may be selected within the range of about 30 to 62.5% in accordance with applications or characteristics. The industrially useful cellulose acetate is usually a cellulose diacetate or a cellulose triacetate. The average degree of acetylation of the cellulose acetate (cellulose diacetate or cellulose triacetate) may be usually about 43.7 to 62.5%, and preferably about 45 to 62%. More specifically, the average degree of acetylation of the cellulose diacetate is, for example, about 43.7 to 58.0% (the average degree of substitution of the acetyl group: 1.7 to 2.6), preferably about 45 to 57.0% (the average degree of substitution: 1.8 to 2.6), and more preferably about 48 to 57.0% (the average degree of substitution: 2.0 to 2.6). The particularly preferred average degree of acetylation of the cellulose diacetate is 53.0 to 56.0%.

In the case of dissolving the cellulose triacetate in a specific solvent (such as methylene chloride), the average degree of acetylation is usually about 58 to 62.5%, preferably about 58.5 to 62% and more preferably about 59 to 62% (e.g., about 60 to 61%) for improved dimensional stability, moisture resistance, heat resistance, and others.

For photograph materials or optical materials, a cellulose acetate film having an average degree of acetylation from 58.0 to 62.5% is commonly used. A cellulose acetate which has an average degree of acetylation of not less than 58% is classified into a cellulose triacetate. The cellulose acetate film is usually produced by the solvent cast method. In the solvent cast method, a film is formed by casting a solution (dope) obtained by dissolving a cellulose acetate in a solvent on a support, and evaporating the solvent.

Regarding a cellulose acetate film and a production process of the film, many improved means have been conventionally proposed. A method for preparing a cellulose acetate solution (dope) has been recently proposed which comprises cooling a mixture of a cellulose acetate and an organic solvent, and heating the mixture to dissolve the cellulose acetate in the organic solvent (Japanese Patent Application Laid-Open No. 95544/1997 (JP-9-95544A), Japanese Patent Application Laid-Open No. 95557/1997 (JP-9-95557A), and Japanese Patent Application Laid-Open No. 95538/1997 (JP-9-95538A), U.S. Pat. No. 5,663,310, and U.S. Pat. No. 5,705,632). According to the method comprising the cooling step and the warming step (hereinafter, the method is referred to as a cooling dissolution method), a solution can be prepared even in the case of using a combination an organic solvent and a cellulose acetate insoluble in the organic solvent in a conventional manner. The cooling dissolution method is effective means in the case where a film is made from a cellulose triacetate (having an average degree of acetylation of not less than 58%) having a low solubility.

As mentioned above, the cooling dissolution method has been developed for producing a film from a cellulose triacetate (having an average degree of acetylation of not less than 58%) having a low solubility. However, in the thickness direction's retardation value (Rt) is increased in a film produced from a cellulose acetate having an average degree of acetylation from 55.0 to 58.0%. Further, the use of the cooling dissolution method ensures a higher retardation value. Moreover, in the casting process, a low residual amount of the solvent and a releasing tension as low as possible in releasing from a metal support ensures a film suitable for a WV film having a high Rt.

The degree of acetylation represents the amount of acetic acid bound and is the weight percentage of bound acetic acid per weight of cellulose unit. The degree of acetylation can be determined in accordance with the procedure for determination of the degree of esterification as set forth in ASTM D-817-91 (test methods for cellulose acetate etc.). The test protocol is as follows. Weigh exactly 1.9 gram of a cellulose acetate, previously dried, dissolve in 150 ml of a mixture of acetone-dimethyl sulfoxide (4:1, v/v), add 30 ml of an aqueous 1N-sodium hydroxide solution, and saponify at 25° C. for 2 hours. Add phenolphthalein as an indicator and titrate the excess sodium hydroxide with 1N-sulfuric acid (concentration factor: F). Perform a blank test in the same manner and calculate the degree of acetylation by means of the following equation.

$$\text{Degree of acetylation (\%)} = [6.5 \times (B-A) \times F]/W$$

wherein "A" represents an amount of 1N-sulfuric acid (ml) added to the sample, "B" represents an amount of 1N-sulfuric acid (ml) added to blank, "F" shows a concentration factor of 1N-sulfuric acid, and "W" is a weight of the sample.

Further, the degree of polymerization of the cellulose acetate, in terms of viscosity average degree of polymerization, is about 200 to 400, preferably about 250 to 400, and more preferably about 270 to 400 (e.g., about 290 to 400). The viscosity average degree of polymerization is usually about 270 to 350. The average degree of polymerization may be determined in accordance with the intrinsic viscosity method of Uda et al. (kazuo Uda, and Hideo Saito, Journal of The Society of Fiber Science and Technology, Japan (Sen-i Gakkaishi), Vol. 18, No. 1, page 105 to 120, 1962). In this method, a solvent may be selected depending on the degree of acetylation of a cellulose acetate, and others. For example, in the case of a cellulose triacetate, the test protocol is as follows. Dissolve a cellulose triacetate in a mixture of methylene chloride/methanol (9/1, by weight) at a predetermined concentration c (2.00 g/L). Then, inject the solution into an Ostward viscosimeter and measure the flow time (in seconds) "t" of the solution between the viscosimeter graduations at 25° C. On the other hand, measure the blank flow time (in seconds) "to" with the above solvent mixture and calculate the viscosity average degree of polymerization by means of the following formula.

$$\eta_{rel} = t/t_0$$

$$[\eta] = (1n\eta_{rel})/c$$

$$DP = [\eta]/(6 \times 10^{-4})$$

wherein "t" shows a flow time (in seconds) of the solution, "$t_0$" shows a flow time (in seconds) of the solvent, "c" represents a cellulose triacetate concentration of the solution (g/L), $\eta_{rel}$ represents a relative viscosity, $[\eta]$ is an intrinsic viscosity, and DP is an average degree of polymerization.

When methylene chloride/methanol=9/1 (by weight) is used as the solvent mixture, for instance, the viscosity of a 6% by weight solution of cellulose triacetate may for example be about 200 to 700 cps (mPa·s), preferably about 250 to 600 cps, and particularly about 250 to 500 cps.

Secondly, the embodiment (2) of the cellulose ester is described.

A mixed fatty acid ester of cellulose means a product obtained by esterifying a cellulose with a mixed fatty acid other than acetic acid in esterification providing a cellulose ester. That is, the mixed fatty acid ester of cellulose may be synthesized by using an acid anhydride or an acid chloride as an acylating agent. In the case where the acylating agent is an acid anhydride, an organic acid (e.g., acetic acid) or methylene chloride is used as a reaction solvent. As a catalyst, a protic catalyst such as sulfuric acid is employed. In the case of using an acid chloride as the acylating agent, a basic compound is used as a catalyst.

In the industrially most common synthesis method, a cellulose is esterified with a mixed organic acid component containing an organic acid corresponding to an acetyl group and other acyl groups (acetic acid, propionic acid, butyric acid) or an acid anhydride thereof (acetic anhydride, propionic anhydride, butyric anhydride) to synthesize a cellulose ester. In this method, a cellulose such as a cotton linter (linter pulp) or a wood pulp is activated with an organic acid such as acetic acid, and then esterified with the use of the mixture of the organic acid component as described above in the presence of a sulfuric acid catalyst.

The organic acid anhydride component is generally used in an excessive amount relative to the amount of the hydroxyl group present in the cellulose. In the esterification treatment, a hydrolysis reaction (depolymerization) of the cellulose main chain (β1→4 glycoside linkage) proceeds in addition to the esterification reaction. Proceeding of the hydrolysis reaction in the main chain contributes to reduction of the polymerization degree of the cellulose ester, and the produced cellulose ester film is deteriorated in the physical properties. It is necessary to decide the reaction conditions such as a reaction temperature in consideration of a polymerization degree or a molecular weight of the resulting cellulose ester.

Needless to say, a cellulose ester can be produced with the use of only organic acid(s) other than acetic acid as an organic acid. However, a film made of the obtained cellulose ester, for example, a cellulose propionate or a cellulose butyrate, is of little practical use because such a film is inferior to the cellulose acetate film in mechanical strength or durability. The most appropriate alternative for a cellulose acetate includes a mixed fatty acid ester of cellulose esterified with organic acids corresponding to acyl groups including acetyl group. These mixed fatty acid esters of cellulose are described in Japanese Patent Application Laid-Open No. 45804/1998 (JP-10-45804A).

The specific examples of the mixed fatty acid ester of cellulose include a cellulose acetate $C_{3-6}$acylate such as a cellulose acetate propionate and a cellulose acetate butyrate, preferably a cellulose acetate $C_{3-4}$acylate, and others.

Thirdly, the embodiment (3) of the cellulose ester is described.

As mentioned above, in the case of using the cellulose ester as a liquid crystal protective film, Rt is required to be as low as possible. However, there is a problem that a cellulose triacetate solution obtained by the cooling dissolution method is low in stability. Moreover, there is also a problem that a cellulose acetate film produced by the cooling dissolution method has a high Rt value.

In an ordinary synthetic method, a cellulose acetate has higher degree of substitution at 2- or 3-position than that at 6-position. Therefore, it is necessary that the above-mentioned reaction conditions are specially adjusted in order to provide the degrees of substitution at 2-, 3- and 6-positions of not less than 2.67 maintaining the degrees of substitution at 2- and 3-positions of not more than 1.95.

As the specific reactive condition, it is preferred to reduce the amount of the sulfuric acid as a catalyst, and to extend the time for the acetylation (or acetification) reaction. The large amount of the sulfuric acid catalyst hastens progress of the acetylation reaction, however, depending on the amount of the catalyst, the cellulose ester is esterified with the sulfuric acid catalyst. On the completion of the reaction, followed by removing the sulfuric acid group from the ester, a residual hydroxyl group occurs. A larger amount of sulfuric acid ester is formed at 6-position having a higher reactivity. Accordingly, when the amount of the sulfuric acid catalyst is large, the degree of substitution at 6-position is small. Therefore, in order to synthesize a cellulose acetate used in the present invention, there can be cited a production method of reducing the amount of the sulfuric acid catalyst as much as possible, and extending the reaction time to cover the lowered reaction rate due to reduction of the catalyst. At the same time, specifically, it is preferred to produce the cellulose acetate in accordance with a method described in Japanese Patent Application Laid-Open No. 338601/2002 (JP-2002-338601A). That is, the following production method is available: a method which comprises a step for allowing a cellulose to react with acetic acid or acetic anhydride in a solvent in the presence of a catalyst (sulfuric acid) to synthesize a cellulose acetate, and a step for ripening the cellulose acetate in the presence of an acetyl group donor, water or an alcohol (0.1 to 10 mol %) relative to the acetyl group donor and a catalyst (sulfuric acid).

The inventors of the present invention found that such a cellulose acetate having a high degree of substitution at 6-position and having a ratio of sulfuric acid group (sulfo group) relative to the amount of calcium in a specific range is particularly suitably used in the present invention for dissolving in a solvent other than methylene chloride, and that such a cellulose acetate can easily obtain a cellulose acetate solution which strikes a balance between heat resistance under wet condition and releasability from a metal support in a solution casting.

The degrees of substitution at 2-, 3- and 6-positions in the cellulose acetate may be determined by propionylating the cellulose acetate and measuring the resulting product by $^{13}$C-NMR. The measuring method is detailed in Tezuka, et al (Carbohydr. Res. 273 (1995) 83-91). These cellulose acetates increased in the degree of substitution at 6-position is detailed in Japanese Patent Application Laid-Open No. 5851/1999 (JP-11-5851A) and Japanese Patent Application Laid-Open No. 338601/2002 (JP-2002-338601A).

A cellulose acetate in which the degrees of substitution at 2- and 3-positions are not less than 1.70 and not more than 1.95 and the degree of substitution at 6-position is not less than 0.88 is preferred. More preferred cellulose acetate is one in which the degrees of substitution at 2- and 3-positions are not less than 1.80 and not more than 1.95 and the degree of substitution at 6-position is not less than 0.88 and not more than 0.95. Further preferred cellulose acetate is one in which the degrees of substitution at 2- and 3-positions are not less than 1.84 and not more than 1.92 and the degree of substitution at 6-position is not less than 0.89 and not more than 0.92.

Incidentally, in the present invention, 1 gram of a cellulose ester means 1 gram of the cellulose ester in absolute dry condition. Since a cellulose ester being usually in a flaky or granulated form contains 20 to 40% of water, it is necessary to remove the water from the cellulose ester before measurement. Moreover, since an optical film or the like using a cellulose ester contains a plasticizer and a additive, the cellulose ester can be obtained by removing these plasticizer and additive with the use of a separation method which comprises immersing the film in an organic solvent with utilizing the difference in the solubility. The manner for removing these plasticizer and additive is detailed in Polymer Analysis Handbook edited by The Japan Society for Analytical Chemistry (issued by Asakura Shoten Co., Ltd.).

Incidentally, in the above embodiment (3) concerning a cellulose triacetate having a specific distribution in the degree of substitution, as far as the cellulose triacetate has the specific distribution in the degree of substitution, the production process or the degree of acetylation may be the same as that of the above embodiment (1).

In the next place, the stabilization treatment is mentioned.

As described above, in the general production method of a cellulose ester, a raw material is allowed to react with an acid such as acetic anhydride by using acetic acid as a solvent, and at that time, a strong acid having a dehydrating action is utilized as a catalyst. As the catalyst, the sulfuric acid is usually employed, and sulfuric acid not only acts as a catalyst but also forms a cellulose sulfate. As a result, in some reactions, the sulfuric acid group remains also in the reaction product. Therefore, such a cellulose ester usually contains a remarkably excessive amount of a stabilizer, for example, an alkali metal (e.g., lithium, potassium, and sodium), a salt thereof or a compound thereof, or an alkaline earth metal (e.g., calcium, magnesium, strontium, and barium), a salt thereof or a compound thereof, in order to improve in heat resistance or heat resistance under wet condition. Thereby stability is imparted to the cellulose ester without the release of sulfuric acid group (sulfo group).

Thus it is arbitrary that the cellulose ester contains an alkali metal or an alkaline earth metal, and the objective to put such a metal is to improve heat stability or heat resistance under wet condition as described above. However, at the same time, it is also confirmed that these alkali metal and alkaline earth metal have an influence on releasability from a metal support in a casting process and spinnability (Japanese Patent Application Laid-Open No. 316701/1998 (JP-10-316701A)). In the case where the amount of the alkaline earth metal to be added is reduced, the cellulose ester is inferior in stability, and heat resistance under wet condition thereof is unsatisfactory. That is, it is recognized that heat resistance under wet condition is not compatible to releasability from a metal support in a casting process (or spinnability).

However, the inventors of the present invention found that each element in the alkaline earth metals has a different effect corresponding to the amount to be added from others, that among the alkali metals and the alkaline earth metals, calcium specifically has an effect on heat resistance under wet condition, and that the ratio of calcium relative to the remaining sulfuric acid (or sulfuric acid group) is related to heat resistance under wet condition or releasability from a metallic material.

That is, the embodiments of the present invention are described as follows:

(a) a cellulose ester in which the molar ratio determined from (A) the total amount (in terms of molar amount) of residual sulfuric acid in 1 gram of the cellulose ester and (B) the total amount (in terms of molar amount) of calcium contained in 1 gram of the cellulose ester fulfills the following formula:

$$0.5 < (B)/(A) < 1.5$$

[e.g., $0.6 < (B)/(A) < 1.4$], (b) a cellulose ester in which the molar ratio determined from (A) the total amount (in terms of molar amount) of residual sulfuric acid in 1 gram of the cellulose ester and (B) the total amount (in terms of molar amount) of calcium contained in 1 gram of the cellulose ester fulfills the following formula:

$$0.5 < (B)/(A) < 1.2$$

[e.g., $0.65 < (B)/(A) < 1.2$], (c) a cellulose ester in which the molar ratio determined from (A) the total amount (in terms of molar amount) of residual sulfuric acid in 1 gram of the cellulose ester and (B) the total amount (in terms of molar amount) of calcium contained in 1 gram of the cellulose ester fulfills the following formula:

$$0.6 < (B)/(A) < 1.0$$

[e.g., $0.7 < (B)/(A) < 1.0$], and (d) a cellulose ester in which the molar ratio determined from (A) the total amount (in terms of molar amount) of residual sulfuric acid in 1 gram of the cellulose ester and (B) the total amount (in terms of molar amount) of calcium contained in 1 gram of the cellulose ester fulfills the following formula:

$$0.75 < (B)/(A) < 1.0$$

[e.g., $0.8 < (B)/(A) < 1.0$].

Incidentally, in the cellulose ester (particularly, a cellulose acetate), the amount of the residual sulfuric acid may be adjusted by the amount of sulfuric acid to be used, and others. The total amount of residual sulfuric acid in 1 gram of the cellulose ester may be, for example, about $0.1 \times 10^{-7}$ to $1000 \times 10^{-7}$ mol, preferably about $1 \times 10^{-7}$ to $500 \times 10^{-7}$ mol (e.g., about $5 \times 10^{-7}$ to $300 \times 10^{-7}$ mol), and more preferably $10 \times 10^{-7}$ to $100 \times 10^{-7}$ mol (e.g., about $10 \times 10^{-7}$ to $50 \times 10^{-7}$ mol).

Moreover, the present invention may be the above-mentioned cellulose ester (particularly a cellulose acetate) (a), (b), (c) or (d); and the cellulose ester is the following cellulose ester (e) or (f) which contains a specific amount of calcium shown below;

(e) a cellulose ester in which (B) the total amount (in terms of molar amount) of calcium contained in 1 gram of the cellulose ester fulfills the following formula:

$$5 \times 10^{-7} < (B) < 20 \times 10^{-7}, \text{ or}$$

(f) a cellulose ester in which (B) the total amount (in terms of molar amount) of calcium contained in 1 gram of the cellulose ester fulfills the following formula;

$$8 \times 10^{-7} < (B) < 15 \times 10^{-7}.$$

The process for adding these stabilizers varies depending on the production method of the cellulose ester. That is, the stabilizer is added as a neutralizing agent in a step for completing the esterification in some cases, or is added in the form of a metal acetate before or during ripening step carried out after the esterification in other cases. Moreover, a metal acetate is added in ageing step, and the same metal acetate is sometimes added after completion of the ripening step. Further, the stabilizer is added in the form of an alkali metal ion and/or an alkaline earth metal ion in a coagulant (or a coagulator) for precipitation of a cellulose ester dope after ripening in some cases. Furthermore, in washing of a cellulose ester obtained by coagulation and precipitation, the above-mentioned ion is added in sometimes. Additionally, in some cases, a solution of a water-soluble alkali metal or alkaline earth metal salt is added to a dried cellulose ester flake or particle by spraying or other means. These methods are sometimes used in combination.

According to the present invention, in the above-mentioned production process of a cellulose ester (cellulose acetate, particularly cellulose triacetate), which comprises acylating (particularly acetylating with an acetylating agent) a cellulose in the presence of sulfuric acid, and hydrolyzing (or deacylating) [particularly ripening] the resulting matter, sulfuric acid as a catalyst usually is neutralized at least in part with a neutralizing agent [in particular a magnesium component such as magnesium oxide, magnesium hydroxide, and a magnesium salt (e.g., a magnesium salt of an inorganic acid such as magnesium carbonate, and a magnesium salt of an organic acid such as magnesium acetate)], and then in an appropriate step, a calcium component as a heat stabilizer [particularly, for example, calcium oxide, calcium hydroxide, a calcium salt (e.g., a calcium salt of an inorganic acid such as calcium carbonate, and a calcium salt of an organic acid such as calcium acetate)] in many cases.

The heat stabilizer (calcium component) may be usually added after acylating (or after esterifying, particularly after acetizing) a cellulose. For example, the heat stabilizer may be added (I) before hydrolysis (ripening) or (II) in a course after ripening before a step of precipitation, or in both timing.

The most preferred method of the present invention includes a method which comprises acylating (particularly, acetylating) a cellulose with an acetylating agent in the presence of sulfuric acid, neutralizing the sulfuric acid at least in part with a neutralizing agent [e.g., a neutralizing agent containing at least a magnesium component (e.g., magnesium acetate)] in an appropriate step after the acylating (in particular, acetylating or acetizing) step [for example, (i) after completing acylating or esterifying (acetizing) step (that is, in a course after acylating (particular acetylating) step before hydrolysis (or ripening)), and/or (ii) in a course after ripening step before adding the calcium component], and adding the calcium component [for example, calcium hydroxide and/or a calcium salt, particularly calcium hydroxide] in the subsequent step of the neutralizing step [for example, after the ripening step (e.g., the coagulating and precipitating step, and the washing)]. By such a method, the ratio of the total amount of sulfuric acid relative to calcium remaining in the cellulose ester can be efficiently adjusted to the above-mentioned range (e.g., 0.5<(B)/(A)<1.5). The concentration or amount of these neutralizing agent and stabilizer may be determined in consideration of a calcium content in a final cellulose ester.

The magnesium content in the cellulose ester (particularly the cellulose acetate) depends on the kind or species of the raw material, or the possibility of magnesium component usage. Even in the case of using a wood pulp (e.g., a hardwood pulp), the magnesium content in 1 gram of the cellulose ester (converted into weight) may be usually selected from not more than 30 ppm (e.g., about 0 to 30 ppm), and may for example be 0 to 25 ppm, preferably not more than 20 ppm (e.g., about 0.1 to 20 ppm), and more preferably not more than about 15 ppm (e.g., about 0.3 to 12 ppm), or may be not more than about 10 ppm (e.g., about 0.5 to 9 ppm), in 1 gram of the cellulose ester.

Examples of the method for reducing the amount of sulfuric acid in the cellulose ester include the following method;
 (1) adding water in the end of acetylation reaction,
 (2) slowly adding water in the neutralization,
 (3) decreasing the amount of sulfuric acid as a catalyst, and
 (4) increasing a temperature before the neutralization or during the ripening.

If necessary, these methods may be suitably used in combination to reduce the amount of the sulfuric acid.

For achieving the objects of the present invention as mentioned above, the ratio of calcium relative to the sulfuric acid group becomes an issue. The molar number of calcium is needed to be at least 0.5 time relative to the molar number of the sulfuric acid group. In the conventional manner, an alkali metal and/or an alkaline earth metal was added in a remarkably excessive amount as compared with the amount of the sulfuric acid group. This is due to a partial carboxylation of a hydroxyl group in the cellulose in the process of esterification. Since such a carboxyl group is present, an alkali metal and/or an alkaline earth metal is added in about double amount of the sulfuric acid group. According to the experiments of the inventors of the present invention, in the case where the molar number of calcium is over 0.5 time relative to that of the sulfuric acid group, required heat resistance under wet condition can be obtained. More preferably, the molar number of calcium is over 0.6 time relative to that of the sulfuric acid group. Furthermore, for releasability from a metal support in the casting, it is necessary that the molar number of calcium should be less than 1.5 times relative to the molar number of the sulfuric acid group. More preferably, the molar number of calcium should be less than 1.0 time relative to that of the sulfuric acid group.

As described above, as far as the sulfuric acid catalyst is used in the esterification step in the cellulose ester, the residual sulfuric acid group cannot be perfectly removed even when the cellulose ester is produced by using the most suitable production process for the aspect of the cellulose ester in the present invention. The residual sulfuric acid group is at the lowest about $10 \times 10^{-7}$ mol per gram of the cellulose ester. Therefore, it is preferred to contain about $5 \times 10^{-7}$ mol of calcium per gram of the cellulose ester. Moreover, in the case where the calcium content is over about $20 \times 10^{-7}$ mol, a problem may occur with the releasability from a metal support in the casting process and spinnability (or spinning property).

As the preferred range, the calcium content (mol) is not less than $5 \times 10^{-7}$ and not more than $20 \times 10^{-7}$ per gram of the cellulose ester. As a particularly preferred range, the calcium content (mol) is not less than $8 \times 10^{-7}$ and not more than $15 \times 10^{-7}$ per gram of the cellulose ester.

It is not clear why calcium and the residual sulfuric acid group do not have an effect on the releasability from a metal support in the casting process and spinnability when the amount of calcium has a specific ratio relative to the residual sulfuric acid group. The reason is supposed as follows. That is, a carboxyl group or a sulfonic acid group (sulfo group) is bonded to the cellulose ester in the esterification step, and calcium ion or magnesium ion is neutralized in the neutralization step, wherein the calcium ion is selectively bonded to the sulfonic acid group. Thereby, false adhesion of the cellulose ester to a metallic material is inhibited by interposing the calcium atom, and as a result the calcium does not exert an influence on the releasability and the spinnability.

As an analysis method of a calcium content in such a cellulose ester, a known method may be utilized. That is, the calcium content may be quantitatively determined by conducting a pretreatment called as the ashing method which comprises burning a cellulose ester completely and dissolving the resulting ash in hydrochloric acid, and analyzing the pretreated matter through an atomic absorption spectrometry. Moreover, the calcium content may be determined by pretreating an absolutely dried cellulose ester with Advanced Microwave Labstation (sulfonitric acid decomposition) and an alkali melting, and analyzing the pretreated matter with ICP-AES (inductively coupled plasma atomic emission spectrometer).

Such a cellulose ester is high in releasability (or is easy to release) from a base support in production of a film by the casting process. Moreover the cellulose ester is excellent in optical characteristics such as transparency. The transparency of the cellulose ester is, for example, about 60 to 100% (preferably about 70 to 100%, more preferably about 75 to 100%), and usually about 70 to 90%. The haze of the cellulose ester is about 1 to 8 (preferably about 1 to 5). Further, a yellowness index (YI) which is an index of yellowness of a cellulose ester is, for example, about 1 to 10. Incidentally, the transparency, the haze and the yellowness index (YI) may be measured according to the following manner.

[Transparency]

Weigh exactly 8.0 gram of a cellulose ester, previously dried, add 125.3 gram of a solvent (e.g., a mixture of methylene chloride-methanol (9:1, w/w) or acetone), and effect thorough dissolution (sample solution having a concentration of 6% by weight). Using an AKA photoelectric calorimeter equipped with a cesium photoelectric tube and a filter No. 12, put the solvent in the glass cell with a light path length of 100 mm and measure the blank transmittance. Then, put the 6% by weight sample solution in the glass cell with a light path length of 100 mm and measure its transmittance. With the blank transmittance value being taken as 100%, the percentage of the transmittance value of the sample solution is recorded as the transparency of the sample.

[Haze]

Weigh exactly 12.0 gram of a cellulose ester, previously dried, add 88.0 gram of a solvent (e.g., a mixture of methylene chloride-methanol (9:1, w/w) or acetone), and effect thorough dissolution (sample solution having a concentration of 12% by weight). Using a turbidimeter (Nippon Denshoku Kogyo Co., Ltd.) and a glass cell (45 mm wide, 45 mm high, light path length 10 mm), perform measurements as follows. Put the solvent in the glass cell, set the cell in the turbidimeter, and perform zeroing and calibration. Then, put the 12% by weight sample solution in the glass cell, set the cell in the turbidimeter, and record the reading.

[Yellowness Index (YI)]

Weigh exactly 12.0 gram of a cellulose ester, previously dried, add 88.0 gram of a solvent (e.g., a mixture of methylene chloride-methanol (9:1, w/w) or acetone), and effect thorough dissolution (a solution in a concentration of 12% by weight). Using a color difference meter (Nippon Denshoku Kogyo Co., Ltd., Color Difference Meter ΣE90) and a glass cell (45 mm wide, 45 mm high; light path length 10 mm), perform measurements and calculate YI by means of the following equation.

$$YI = YI2 - YI1$$

wherein YI1 represents YI for the solvent, and YI2 shows YI for the 12% by weight sample solution.

Further, the above cellulose esters have a high solution stability, filterability and spinnability, and thus remarkably reduce the frequency of thread breakage in a continuous spinning for a long time.

Moreover, the cellulose ester of the present invention is high in heat resistance under wet condition as described above. The present invention therefore also includes, as described above, a method for improving heat resistance under wet condition of a cellulose ester, which comprises adjusting (A) the total amount (in terms of molar amount) of residual sulfuric acid in 1 gram of the cellulose ester and (B) the total amount (in terms of molar amount) of calcium contained in 1 gram of the cellulose ester so that the molar ratio (B)/(A) is in the range of the above-mentioned formulae (e.g. 0.5<(B)/(A)<1.5).

Incidentally, the heat resistance under wet condition may be determined as follows.

About 2.0 gram of a cellulose ester, previously dried and pulverized, is weighed in a heat-resistant glass tube, and 2 ml of a distilled water is added thereto. The glass tube is sealed, and put in a pure water (boiling water) for 7 hours. After cooling, the content is washed out with a boiling (pure) water on a filter paper, and the filtrate is made into 150 ml in total. This filtrate is titrated with 0.01N-NaOH solution (aqueous solution) by using phenolphthalein as an indicator. At the same time, a blank test is carried out with the use of only pure water, and heat resistance under wet condition is calculated based on the following formula:

Heat resistance under wet condition (%)=(A−B)×F× 0.06/sample weight (gr.)

wherein "A": a titer (ml) of 0.01N-NaOH solution (aqueous solution), "B": a titer (ml) of 0.01N-NaOH solution (aqueous solution) in the blank test, and "F": a factor of 0.01N-NaOH solution (aqueous solution).

The heat resistance under wet condition (%) of the above-mentioned cellulose ester measured through the above method is not more than about 0.08% (e.g., about 0.01 to 0.08%), preferably not more than about 0.07% (e.g., about 0.02 to 0.065%), more preferably not more than about 0.06% (e.g., about 0.02 to 0.055%), and particularly about not more than 0.05% (e.g., about 0.02 to 0.05%).

The cellulose acetate of the present invention having such properties is useful for preparing a cellulose acetate solution (dope) and producing a film or a fiber.

(i) The dope of the present invention comprises at least a cellulose ester among the above-mentioned cellulose esters in embodiments (1) to (3). (ii) The dope of the present invention belongs to at least one of the above-mentioned embodiments (1) to (3) of the present invention. Moreover, a mixture of the embodiments (1) to (3) of the cellulose esters of the present invention obtained by mixing a plurality of cellulose esters can also belong to at least one of the above-mentioned embodiments (1) to (3) of the present invention.

The dope usually comprises a cellulose ester and a solvent (an organic solvent). Depending on the average degree of acetylation in the cellulose ester and others, the solvent may for example be selected from a halogenated hydrocarbon (e.g., methylene chloride, and ethylene chloride), a ketone (e.g., acetone, methyl ethyl ketone, methyl isobutyl ketone, and cyclohexanone), an ester (e.g., a formic ester such as ethyl formate, an acetic ester such as methyl acetate or ethyl acetate, and ethyl lactate), an ether (e.g., dioxane, and dimethoxyethane), a cellosolve (e.g., methyl cellosolve, and ethyl cellosolve), a cellosolve acetate (e.g., methyl cellosolve acetate, and ethyl cellosolve acetate), and a mixture of these compositions. The solvent may comprise a nitro compound (e.g., nitromethane, nitroethane, and nitropropane), a lower alcohol (e.g., methanol, ethanol, isopropanol, butanol, and diacetone alcohol), and others.

In the case of using a cellulose ester of the embodiment (2) of the present invention, a stable dope can be obtained without a halogenated hydrocarbon as a solvent. Moreover, in the case of using a cellulose ester of the embodiment (3) of the present invention, the cellulose ester can be dissolved in an organic solvent by cooling the solvent even if a halogenated hydrocarbon is not used as a solvent.

The amount to be used of the solvent may be selected from such a range in which casting property in film forming, spinnability, handleability, and others are not deteriorated. For example, the amount of the solvent is about 150 to 1000 parts by weight (concentration of cellulose ester=about 10 to 40% by weight), and preferably about 200 to 900 parts by weight (concentration of cellulose ester=about 10 to 30% by weight), relative to 100 parts by weight of the cellulose ester. The content of the cellulose ester is usually about 10 to 25% by weight (e.g., about 10 to 20% by weight). Thus obtained dope is useful for forming a film by the casting process.

In the film casting, usually a cellulose diacetate or a cellulose triacetate (particularly a cellulose triacetate) is employed. A film through the dope casting is usually obtained by flow-casting a dope to a support and partially drying the dope, releasing it from the support, and drying it. As the support (or base material), there may be used a conventional support, for example, a mirror-finished metal support (e.g., a stainless-steel support), and others.

As described above, since the cellulose ester of the present invention is high in releasability (releasing property) from the support, a semi-dried film can be smoothly released from the support, and a cellulose ester film having a high surface smoothness can be obtained. Therefore, the method using the dope of the present invention is useful as a method improving the releasability of film from support.

Moreover, the cellulose ester film of the present invention is excellent in optical characteristics (e.g., yellowness index (YI), haze, and transparency) because the film comprises the above-mentioned cellulose ester. The thickness of thus obtained cellulose ester film may be selected depending on its usage from a range of e.g., about 5 to 500 μm, preferably about 10 to 200 μm, more preferably about 20 to 140 μm, and further preferably about 30 to 130 μm (particularly about 50 to 120 μm). Incidentally, the cellulose ester of the present invention is not only useful for forming an optical film (e.g., a photographic film, a protective film for a polarizer, a retarder film, a scattering film, a wide-view-angle film (a WV film), and a film for a color filter) by the casting process, but also utilized for producing a thin optical film by a spincoating method because the cellulose ester is excellent in releasability from the support.

The cellulose ester of the present invention is also superior in stability, filterability, and spinnability of the dope as describe above. When a fiber is produced by spinning process, a cellulose diacetate or a cellulose triacetate is usually employed as the cellulose ester. The spinning process may be carried out by a conventional method, for example, by spinning a dope from a spinneret having many fine holes and drying the spinning yarns or threads, and if necessary drawing or stretching the fibers. The use of the dope of the present invention in the spinning process may prevent clogging or choking of the holes or threads for a long time. Therefore, the method with use of the dope of the present invention is useful for improving spinnability.

The cellulose ester or the dope of the present invention may contain a plasticizer, for example, a phosphoric ester such as triphenyl phosphate (TPP) and tricresyl phosphate (TCP), a phthalic ester such as dimethyl phthalate (DMP), diethyl phthalate (DEP), dibutyl phthalate (DBP), dioctyl phthalate (DOP) and di-2-ethylhexyl phthalate (DEHP), a fatty acid ester such as butyl oleate, methylacethyl ricinoleate and dibutyl sebacate, a citric ester such as acetyltriethyl citrate (OACTE) and acetyltributyl citrate (OACTB), a trimellitic ester, and others. These plasticizers may be used singly or in combination. The cellulose ester may contain an aging inhibitor, for example, an antioxidant, an ultraviolet ray absorbing agent, a peroxide decomposer, a radical scavenger, a metal deactivator or sequestrant, an acid acceptor, and others. Further, if necessary, the cellulose ester may contain other additive(s), for example, a nucleating agent, an inorganic powder (e.g., a diatomaceous earth (or a diatomite), calcium carbonate, and titanium oxide), a thermal stabilizer (or a heat stabilizer), a flame retardant, a coloring agent, and others.

INDUSTRIAL APPLICABILITY

The use of the cellulose ester of the present invention (a cellulose ester in which the contents of the alkali metal and the alkaline earth metal are in a specific range) ensures obtaining a film which has a high releasability from a support in the casting process and is excellent in surface smoothness and optical characteristics with being excellent in heat resistance under wet condition. Moreover, the cellulose ester of the present invention is also excellent in stability of the dope, filtrating property or spinnability and heat stability.

EXAMPLES

The following examples are intended to describe the present invention in further detail and should by no means be interpreted as defining the scope of the invention. Incidentally, the reaction temperature and time, catalyst amount and others described in the Examples are limited to the case conducted by the apparatus of the inventor of the present invention. The reaction of the cellulose ester is a complicated solid-liquid reaction, and the results naturally vary depending on the size, shape and temperature-measuring site of the reactor, and other factors. Since important factors are a $Ca/SO_4$ ratio disclosed in the present invention and an amount of calcium, it goes without saying that other conditions should be set to optimum conditions to ensure necessary physical properties in response to the reactor.

[Releasability]

Incidentally, the releasability of the film from the support in the casting process was evaluated as follows. A cellulose ester (100 parts by weight) was mixed with 320 parts by weight of methylene chloride, 40 parts by weight of methanol, 25 parts by weight of butanol and 15 parts by weight of triphenyl phosphate (TPP) to prepare a dope. The dope was cast on a smooth stainless-steel plate (support) in a thickness of about 1 mm at a room temperature (20 to 25° C.), and allowed to stand at the room temperature for 3 to 4 minutes. Then, the releasability of the film from the support was evaluated based on the following criteria.

"A": Smoothly released with a minimum of peel drag and the film surface was smooth.

"B": Not smoothly released but a considerable peel drag was felt, film peelings remain on the stainless steel plate.

[Content of Alkaline Earth Metal]

A dried cellulose ester was completely burned, and then the resulting ash was dissolved in hydrochloric acid. After such a pretreatment, the content of the alkaline earth metal was measured by the atomic absorption spectrometry. The measured value is obtained as the content of each alkaline earth metals in 1 gram of the cellulose ester in an absolute dry condition at ppm unit.

[Amount of Sulfuric Acid]

The total sulfuric acid in the cellulose ester was determined by combusting a dried cellulose ester in an electric furnace at 1300° C., trapping the evolved sulfurous acid gas in 10% hydrogen peroxide-water, and titrating it with a normalized sodium hydroxide solution (a sodium hydroxide solution having a given normality, usually 0.01 to 1N sodium hydroxide solution). The data are in terms of $SO_4^{2-}$. The content of sulfuric acid is obtained as the determined value in 1 gram of the cellulose ester in an absolute dry condition at ppm unit.

[$Ca/SO_4$ Ratio]

A $Ca/SO_4$ ratio is calculated from the calcium content among the contents of the alkaline earth metals and the amount of sulfuric acid. The $Ca/SO_4$ ratio is molar ratio. Namely, by dividing the amount of sulfuric acid by 96, (i) the sulfuric acid content in 1 gram of the cellulose ester is obtained in mol unit. In the same way, (ii) by dividing the calcium content among the contents of the alkaline earth metals by 40.1, the calcium content in 1 gram of the cellulose ester is obtained in mol unit. Accordingly, by dividing (ii) by (i), the $Ca/SO_4$ ratio can be determined.

[Heat Resistance Under Wet Condition]

A cellulose ester (about 2.0 g), previously dried and pulverized, was weighed in a heat-resistant glass tube, and 2 ml of a distilled water was added to the glass tube. Then the glass tube was sealed and put in a pure water (boiling water) for 7 hours. After cooling, the content was washed out with boiling water on a filter paper, and the filtrate was made into 150 ml in total. This filtrate was titrated with 0.01N-NaOH solution (aqueous solution) by using phenolphthalein as an indicator. At the same time, a blank test is carried out with the use of only pure water, and heat resistance under wet condition was calculated based on the following formula:

Heat resistance under wet condition (%)=$(A-B) \times F \times 0.06$/sample weight (gr., or gram (g))

wherein "A": a titer (ml) of 0.01N-NaOH solution, "B": a titer (ml) of 0.01N-NaOH solution (aqueous solution) in the blank test, and "F": a factor of 0.01N-NaOH solution (aqueous solution).

The heat resistance under wet condition is an index indicating difficulty of hydrolysis of a cellulose ester in the case where the cellulose ester has enough moisture and is exposed to a high temperature. When the index of a cellulose ester is not more than 0.08%, the cellulose ester is evaluated as having stability. That is, in the case where a film is made from the obtained cellulose acetate with the above-mentioned method, problems accompanied with hydrolysis of the cellulose ester hardly occur even when the cellulose ester is maintained for a long period (e.g., 100 hours) under a condition of high temperature and high humidity (e.g., 40° C. and 90RH %).

Examples 1, 2 and 5 and Comparative Examples 1 to 3

Preparation of Cellulose Acetate

One hundred (100) parts by weight of a hardwood kraft pulp (α-cellulose content 98.5%) was sprayed with 50 parts by weight of glacial acetic acid for activation. Then, a mixture of 445 parts by weight of glacial acetic acid, 265 parts by weight of acetic anhydride and 8.3 parts by weight of sulfuric acid was added to the activated mixture, and the esterification was carried out in the conventional manner. Thereafter, the hydrolysis reaction was carried out, magnesium acetate was added as a neutralizing agent to the reaction mixture, and the ripening was conducted for about 70 minutes at 60 to 70° C. Further, the resultant was discharged in diluted acetic acid to precipitate a raw cellulose triacetate. Thus obtained precipitate was divided into 6 parts, and the solid and the liquid components in each parts were separated from each other by dehydration and washing with a purified water to give a purified cellulose triacetate (CTA) having a degree of acetylation (average degree of acetylation) of 60.8% and a viscosglacial acetic acid, 265 parts by weight of acetic anhydride and 8.3 parts by weight of sulfuric acid was added to the activated mixture, and the esterification was carried out in the conventional manner. Thereafter, the hydrolysis reaction was carried out, magnesium acetate was added as a neutralizing agent to the reaction mixture, and the ripening was conducted for about 70 minutes at a temperature about 10° C. higher than that of Example 1. Further, the resultant was discharged in diluted acetic acid to precipitate a raw cellulose triacetate. Thus obtained precipitate was divided into 4 parts, and the solid and the liquid components in each parts were separated from each other by dehydration and washing with a purified water to give a purified cellulose triacetate (CTA) having a degree of acetylation (average degree of acetylation) of 60.8% and a viscosity-average degree of polymerization of 303, and each CTA obtained from the above 4 parts was used in Examples 6 to 9, respectively.

[Post-Treatment]

Each flake of the above-mentioned cellulose triacetate was dipped for treatment with calcium hydroxide aqueous solutions each having different concentrations of 5 to 30 ppm, respectively. Then, each of the treated flakes was filtrated off and dried to give a cellulose triacetate containing metal components described in Table 1. Further, Table 1 shows evaluation results of heat resistance under wet condition and the releasability of a film by the casting process.

TABLE 1

| Test Examples | Ca (ppm) | Mg (ppm) | Amount of sulfuric acid (ppm) | Ca SO$_4$ | Heat resistance under wet condition (%) | Ca ($10^{-7}$ mol) | Mg ($10^{-7}$ mol) | Releasability |
|---|---|---|---|---|---|---|---|---|
| Com. Ex. 1 | 1.3 | 17.0 | 190 | 0.02 | 0.213 | 0.3 | 7.0 | A |
| Com. Ex. 2 | 23.3 | 15.0 | 190 | 0.29 | 0.150 | 5.8 | 6.2 | A |
| Com. Ex. 3 | 34.7 | 14.0 | 200 | 0.42 | 0.096 | 8.7 | 5.8 | A |
| Ex. 1 | 40.5 | 14.0 | 190 | 0.51 | 0.077 | 10.1 | 5.8 | A |
| Ex. 2 | 46.7 | 14.0 | 200 | 0.56 | 0.052 | 11.7 | 5.8 | A |
| Ex. 5 | 66.2 | 20.0 | 180 | 0.88 | 0.040 | 16.5 | 8.2 | A |
| Ex. 6 | 41.5 | 9.0 | 100 | 0.99 | 0.046 | 10.4 | 3.7 | A |
| Ex. 7 | 31.5 | 8.7 | 100 | 0.75 | 0.048 | 7.9 | 3.6 | A |
| Ex. 8 | 21.4 | 9.4 | 100 | 0.51 | 0.060 | 5.3 | 3.9 | A |
| Ex. 9 | 57.5 | 9.0 | 100 | 1.38 | 0.048 | 14.3 | 3.7 | A | ity-average degree of polymerization of 313, and each CTA obtained from the above 6 parts was used in Examples 1, 2 and 5 and Comparative Examples 1 to 3, respectively.

[Post-Treatment]

Each flake of the above-mentioned cellulose triacetate was dipped for treatment with calcium hydroxide aqueous solutions each having different concentrations of 5 to 30 ppm, respectively. Then, each of the treated flakes was filtrated off and dried to give a cellulose triacetate containing metal components described in Table 1. Further, Table 1 shows evaluation results of heat resistance under wet condition and the releasability of a film by the casting process.

Examples 6 to 9

Examples 6 to 9 are described below.
[Preparation of Cellulose Acetate]
In the same manner as in Example 1, one hundred (100) parts by weight of a hardwood kraft pulp (α-cellulose content 98.5%) was sprayed with 50 parts by weight of glacial acetic acid for activation. Then, a mixture of 445 parts by weight of As apparent from Comparative Examples 1 to 3 and Examples 1 to 2 and 5 to 9 in Table 1, the heat resistance under wet condition has an inflection point between the Ca/SO$_4$ ratio of 0.42 and 0.56. In the case where the ratio is not less than 0.50, the value of the heat resistance under wet condition may be considered as not more than 0.08%. As apparent from comparison of Examples 6 to 8 and Comparative Example 3, which have almost the same content of the alkaline earth metals, it is impossible to ensure an excellent heat resistance under wet condition even when the cellulose ester contains an alkaline earth metals of about 50 ppm or $14 \times 10^{-7}$ mol per gram of the cellulose ester in dry weight, and it is clear that the ratio between the amounts of sulfuric acid and calcium is an important factor for heat resistance under wet condition.

Examples 3 and 4

Examples 3 and 4 are described below.
[Preparation of Cellulose Acetate]
(Synthesizing Step)
A wood pulp (water content: 7.3% by weight) containing an α-cellulose in the amount of about 98.5% was broken into pieces. To 100 parts by weight of the pulp, 30 parts by weight of glacial acetic acid was evenly sprinkled. The resulting mixture was then stirred. After left at a room temperature for 90 minutes, the mixture was poured into another mixture of 270 parts by weight of cooled acetic anhydride, 380 parts by weight of acetic acid and 7 parts by weight of 98% sulfuric acid. The temperature of the obtained mixture was linearly elevated for 60 minutes from 0° C. (when the reaction was started) to 37° C. by external intercooling and heating system. The temperature was then kept at 37° C. for 90 minutes, to synthesize a cellulose acetate.

(Ripening Step)

To a dope of the above-prepared cellulose acetate, an aqueous solution of acetic acid was added. The mixture was heated to 54° C., and kept at the temperature for 115 minutes to ripen the cellulose acetate. The amounts of acetic acid (acetyl donor), water and sulfuric acid (catalyst) in the mixture were 1930 parts by weight, 64 parts by weight and 21 parts by weight, respectively, based on 499 parts by weight of the cellulose acetate. Accordingly, the ratio of water relative to acetic acid (acetyl donor) was 11 mol %. Thus obtained solution was maintained at 30° C. for three hours to ripen the cellulose acetate.

After the ripening step was completed, a magnesium acetate aqueous solution was added to the ripened solution with stirring. The resulting solution was added to 10% by weight acetic acid aqueous solution to give a precipitate. The formed precipitate was divided into two parts, and each part was collected by filtration, and then washed with flowing warm and pure water. After draining, the wet cellulose acetate was collected in Examples 3 and 4.

(Analysis for Cellulose Acetate)

Regarding the cellulose acetate produced for Examples 3 and 4, the degrees of substitution at 2-, 3- and 6-positions (2DS, 3DS and 6DS), and the degree of polymerization thereof were measured. The degrees of substitution were measured in accordance with Tezuka, Carbohydr. Res. 273, 83 (1995). First, dissociated (or free) hydroxyl groups in the sample (cellulose acetate) are changed into propionate esters with propionic acid anhydride in pyridine. Thus obtained sample was then dissolved in deuteriotrichloromethane, and a $^{13}$C-spectrum was measured. The carbonyl carbons in the acetyls at 2-, 3- and 6-positions give signals in the order from higher magnetic field in the range of 169 ppm to 171 ppm. The carbonyl carbons in the propionate esters at 2-, 3- and 6-positions give signals in the order from higher magnetic field in the range of 172 ppm to 174 ppm. According to the obtained signals, the ratio between acetyl and propionyl at 2-, 3- or 6-position was determined to obtain the distribution of acetyls in the sample cellulose acetate. In accordance with this analytical method, the values of 6DS, 2DS and 3DS were 0.901, 0.945 and 0.941, respectively. The degree of polymerization (average degree of polymerization) was 284. Concerning these numeric values, there was no significant difference between Examples 3 and 4.

[Post-Treatment]

This cellulose acetate was subjected to the post-treatment in the same way as in Examples 1, 2 and 5 to 9 and Comparative Examples 1 to 3. That is, in Examples 3 and 4, these cellulose acetates were dipped for treatment with calcium hydroxide aqueous solutions each having a concentration of 5 to 30 ppm different from each other. Then, each of the treated matter was filtrated off and drained, and dried with hot-air. Further, the heat resistance under wet condition and the releasability of the film by the casting process were evaluated. These results are shown in Table 2.

As apparent from Table 2, the cellulose esters of Examples 3 and 4 are excellent in the heat resistance under wet condition. Further, the releasability is also favorable.

TABLE 2

| Test Examples | Ca (ppm) | Mg (ppm) | Amount of sulfuric acid (ppm) | Ca SO$_4$ | Heat resistance under wet condition (%) | Ca (10$^{-7}$ mol) | Mg (10$^{-7}$ mol) | Releasability |
|---|---|---|---|---|---|---|---|---|
| Ex. 3 | 71.5 | 3.0 | 250 | 0.69 | 0.049 | 17.8 | 1.2 | A |
| Ex. 4 | 66.1 | 3.0 | 200 | 0.79 | 0.051 | 16.5 | 1.2 | A |

The invention claimed is:

1. A cellulose ester fulfilling the following formula:

$$0.5<(B)/(A)<1.2$$

wherein (A) is the total molar amount of residual sulfuric acid in 1 gram of said cellulose ester, (B) is the total molar amount of calcium contained in 1 gram of said cellulose ester, the total amount (A) of residual sulfuric acid in 1 gram of said cellulose ester is from $1\times10^{-7}$ to $500\times10^{-7}$ mol, and wherein the cellulose ester is a cellulose acetate having an average degree of acetylation from 58 to 62.5%;

and wherein a heat stability of the cellulose ester under wet conditions, or heat resistance under wet conditions, is not more than 0.08% based on the following formula:

% heat stability or resistance under wet conditions=(C−D)×F×0.06/sample weight in grams wherein "C": a titer in terms of ml of 0.01N-NaOH aqueous solution, D": a titer in terms of ml of 0.01N-NaOH aqueous solution in the blank test, and "F": a factor of 0.01N-NaOH aqueous solution wherein said cellulose ester is prepared by acetylating a cellulose in the presence of a sulfuric acid catalyst;

hydrolyzing the acetylated cellulose to obtain the cellulose acetate;

neutralizing said sulfuric acid at least in part with a neutralizing agent before or after the hydrolyzing step, wherein the neutralizing agent is a magnesium containing component; and adding a calcium component after the neutralizing step to thereby obtain the cellulose ester.

2. A cellulose ester according to claim 1, which fulfills the following formula:

$$0.75<(B)/(A)<1.0$$

wherein (A) is the total molar amount of residual sulfuric acid in 1 gram of said cellulose ester, and (B) is the total molar amount of calcium contained in 1 gram of said cellulose ester.

3. A cellulose ester according to claim 1, wherein the total molar amount (B) of calcium contained in 1 gram of said cellulose ester fulfills the following formula $$5 \times 10^{-7} < (B) < 20 \times 10^{-7}.$$

4. The cellulose ester according to claim 1, wherein a combined degree of substitution at positions 2 and 3 is not less than 1.70 and not more than 1.95, and wherein a degree of substitution at position 6 is not less than 0.88.

5. The cellulose ester according to claim 1, wherein a combined degree of substitution at positions 2 and 3 is not less than 1.84 and not more than 1.92, and wherein a degree of substitution at position 6 is not less than 0.89 and not more than 0.92.

6. An optical film comprising the cellulose ester recited in of claim 1.

7. The optical film according to claim 6, wherein the optical film is a polarizer protective film, a retarder film, a scattering film, or a widen viewing angles film.

8. A process for producing a cellulose ester fulfilling the following formula:

$$0.5 < (B)/(A) < 1.2$$

wherein (A) is the total molar amount of residual sulfuric acid in 1 gram of said cellulose ester, (B) is the total molar amount of calcium contained in 1 gram of said cellulose ester, the total amount (A) of residual sulfuric acid in 1 gram of said cellulose ester is from $1 \times 10^{-7}$ to $500 \times 10^{-7}$ mol, and wherein the cellulose ester is a cellulose acetate having an average degree of acetylation from 58 to 62.5%;

and wherein a heat stability of the cellulose ester under wet conditions, for heat resistance under wet conditions, is not more than 0.08% based on the following formula:

% heat stability or resistance under wet conditions=(C−D)×F×0.06/sample weight in grams wherein "C": a titer in terms of ml of 0.01N-NaOH aqueous solution, "D": a titer in terms of ml of 0.01N-NaOH aqueous solution in the blank test, and "F": a factor of 0.01N-NaOH aqueous solution which comprises acetylating a cellulose in the presence of a sulfuric acid catalyst;

hydrolyzing the acetylated cellulose to obtain the cellulose acetate;

neutralizing said sulfuric acid at least in part with a neutralizing agent before or after the hydrolyzing step, wherein the neutralizing agent is a magnesium containing component; and adding a calcium component after the neutralizing step, thereby producing the cellulose ester.

9. A process according to claim 8
wherein the molar ratio (B)/(A) determined from
(A) the total molar amount of residual sulfuric acid in 1 gram of the cellulose acetate and
(B) the total molar amount of calcium contained in 1 gram of said cellulose acetate, is adjusted into the range of the following formula:

$$0.5 < (B)/(A) < 1.2$$

by addition of calcium hydroxide as the calcium component.

* * * * *